Oct. 11, 1932.　　　W. A. BOLZ, SR　　　1,882,542
FOUR-WHEEL STEERING CONSTRUCTION
Filed May 29, 1930　　　3 Sheets-Sheet 1
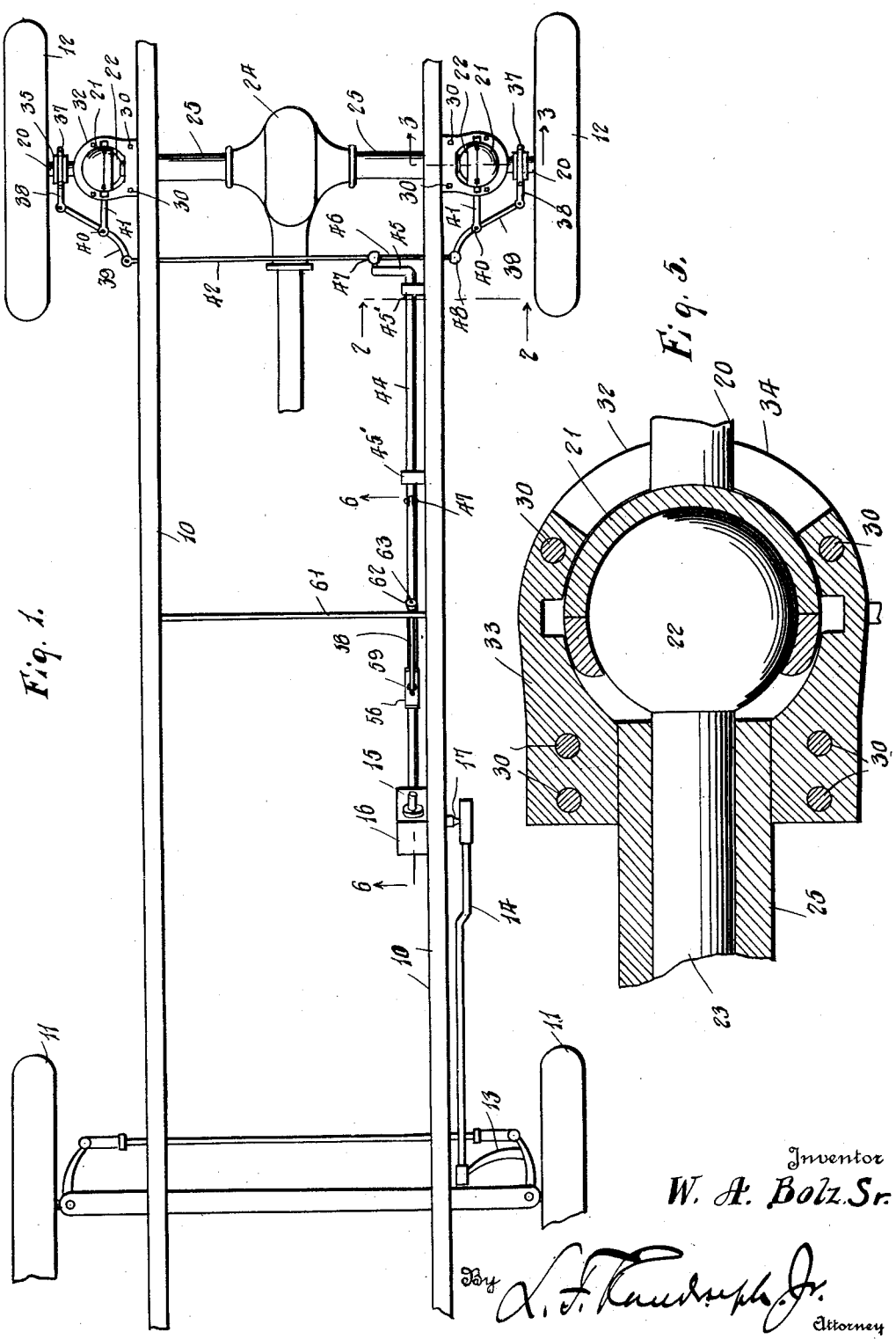

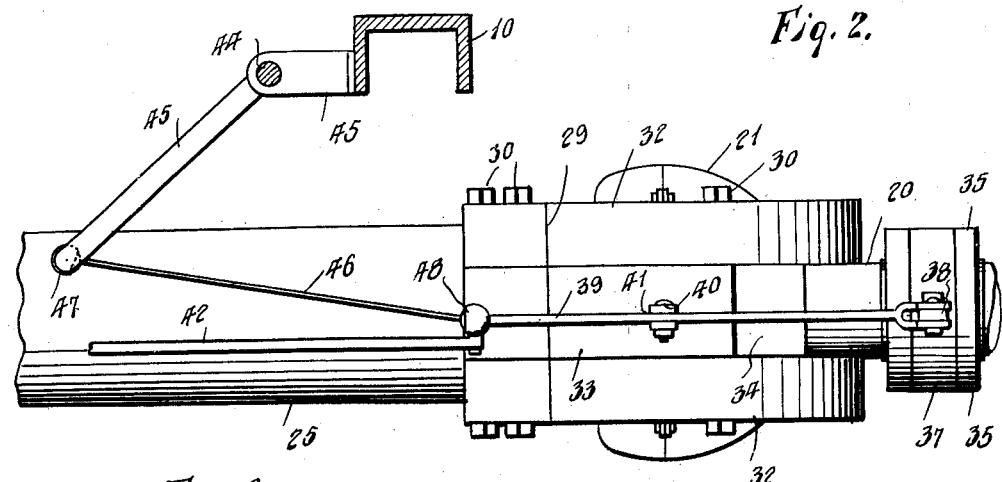
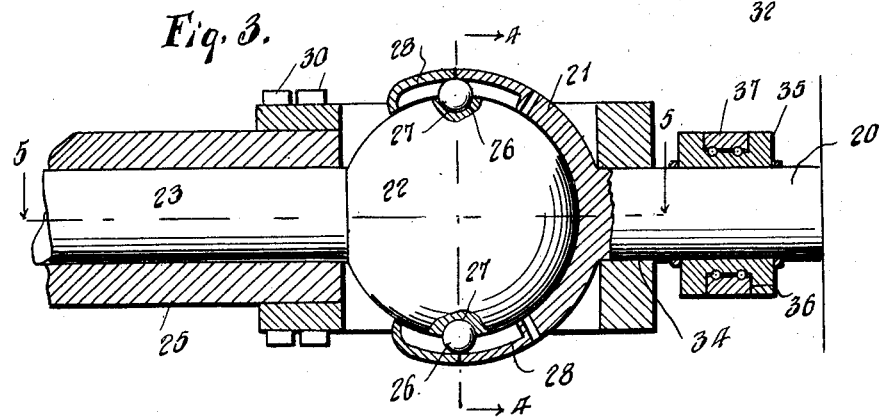
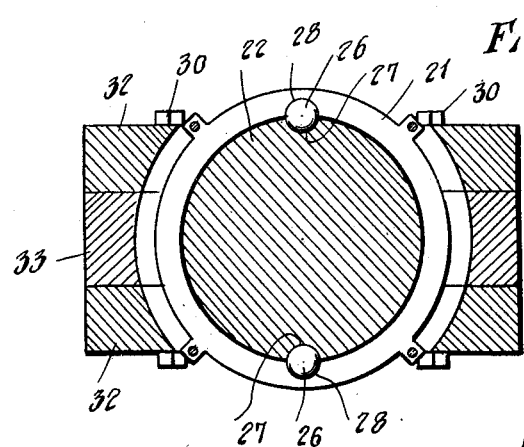

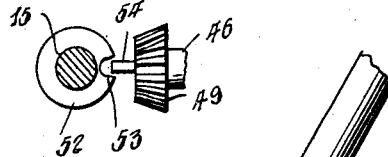
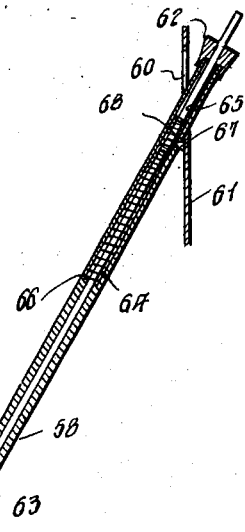
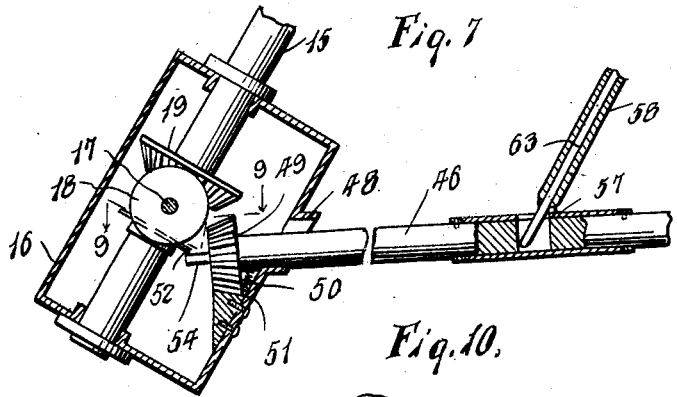
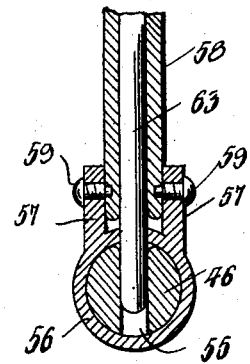
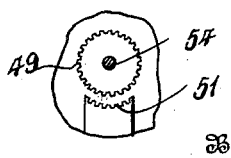

Patented Oct. 11, 1932

1,882,542

UNITED STATES PATENT OFFICE

WILLIAM A. BOLZ, SR., OF TRENTON, NEW JERSEY

FOUR-WHEEL STEERING CONSTRUCTION

Application filed May 29, 1930. Serial No. 457,149.

This invention relates to an automobile or other self-propelled vehicle and it aims to provide means whereby all four of the wheels may be steered so as to facilitate maneuvering into a restricted parking space or the like.

Another object is to provide a novel construction wherein connection is made between the rear wheels and the steering mechanism of the front wheels so that the steering motion imparted to the front wheels will be transmitted to the rear wheels.

It is also aimed to provide a novel means whereby the rear wheels will normally be held locked against turning so that the machine will operate as usual.

The more specific objects and advantages will become apparent from a consideration of the description following taken in connection with accompanying drawings illustrating an operative embodiment.

In said drawings:—

Figure 1 is a plan view of an automobile chassis showing my improvements applied thereto, Figure 2 is a cross sectional view taken on the line 2—2 of Figure 1, Figure 3 is a cross sectional view taken on the line 3—3 of Figure 1, Figure 4 is a cross sectional view taken on the line 4—4 of Figure 3, Figure 5 is a sectional view taken on the line 5—5 of Figure 3, Figure 6 is a sectional view taken on the line 6—6 of Figure 1, Figure 7 is a view of most of the parts of Figure 6 but showing the same in normal position, Figure 8 is a cross sectional view taken on the line 8—8 of Figure 6, Figure 9 is a cross sectional view taken on the line 9—9 of Figure 7, and Figure 10 is a cross sectional view taken on the line 10—10 of Figure 6.

Referring specifically to the drawings, 10 designates the usual side beams of the chassis of an automobile, 11 the front wheels thereof and 12 the rear wheels. Said wheels 11 are dirigibly connected for steering in the usual manner of front wheels, the mechanism being shown generally at 13 and having a drag link 14 operatively connected with a steering post or column 15 suitably journaled in a gear casing 16. A stub shaft 17 is operatively connected with the drag link 14, extends into the casing 16 and has a bevel gear wheel 18 thereon which is in mesh with the bevel gear wheel 19 on the steering member 15.

The rear wheels 12 are carried by stub shafts 20 having socket portions 21 surrounding balls 22 which are provided on the outer ends of the rear axle sections 23 connected together in the usual manner through a differential 24, the axle sections 23 being mounted in housings 25. The stub shafts 20 are connected to the axles 23 in such manner as to always rotate therewith and in addition, to swing about a vertical axis at times, which axis passes through the center of the balls 22. In this connection, ball bearings 26 are located in hemi-spherical sockets 27 of the balls 22 in line with such vertical axes and the balls extend into elongated recesses 28 provided in the sockets 21.

In order to mount the shaft 20, suitable brackets 29 are bolted to the housings 25 or otherwise secured thereto as at 30, such brackets being of any desired form but preferably made up of three sections, two of which are designated 32 and arranged on opposite sides of an intermediate section 33, the latter being of such size as to provide a lateral elongated slot at 34 through which the shafts 20 extend and in which they are adapted for lateral movement. Adjacent each bracket 29, the stub shafts 20 have collars 35 fixed thereto which are provided with grooves 36 in which rings 37 are loosely but rotatably disposed. Lugs 38 extend from the collars and have levers 39 pivoted thereto, which levers are also pivoted on vertical axes at 40 to lugs 41 fastened to the brackets 29. The levers 39 have opposite ends of a connecting link 42 pivoted to the same.

An operating rod for the link 42 is provided at 44 being arranged parallel and relatively close to one of the side beams 10 and journaled in brackets 45' fastened thereto. Such rod 44 has a crank 45 and a link 46 is substantially universally connected at 47 to the crank 45 and at 48 to the link or connecting rod 42. Thus when the operating rod 44 is turned, it will impart steering movement to the rear wheels 12.

Operating rod 44 has a forward section 46 pivoted to the rear section on a horizontal axis at 47, which section 42 is adapted for a slight vertical swinging movement and passes through an elongated slot 48 in the casing 16. At the forward end, such shaft or section 46 carries a bevel gear wheel 49. Bevel gear wheel 49, unless the shaft 46 is depressed, meshes with the bevel gear wheel 19 through the urgency of a relatively strong spring at 50, whereby the rear wheels are coupled with the steering mechanism of the front wheels and hence all of the wheels of the vehicle may be maneuvered through the turning of the steering member 15. Normally, however, the shaft or section 46 is lowered as shown in Figure 7, against the tension of the spring 50 in which position, the gear wheel 49 has its teeth in mesh with a stationary toothed rack 51, thus holding the rear wheels against the possibility of steering or any movement other than the usual rotation thereof for driving purposes.

It will be noted that a disk 52 is provided about the steering member 15 within the casing 16 which has a slot 53 therethrough. Adjacent the slot 53 is a lug 54 axially extending from the shaft extension 46. The slot 53 is so positioned that it will aline with the lug 54 only when the rear wheels of the vehicle are straight or in usual position so that, when gear wheel 49 is disengaged from the gear wheel 19, it will be known that the rear wheels are straight since in order for the gear wheel 49 to move from the position of Figure 6 to Figure 7, the lug 54 must pass through the said slot 53.

Extension rod 46 is provided with a transverse slot 55 therethrough and adjacent the same is surrounded by a sleeve or coupling 56 having ears 57 to which a hollow rod 58 is pivoted at 59. Such rod 58 passes through an elongated slot 60 in the dash board 61 and above the same has an operating knob or cap 62. Slidably disposed in the hollow rod 58 is a latch rod 63 which when the rear wheels are in normal or straight position, extends into the slot 55 so that the shaft section 46 and connected parts and rear wheels cannot turn. Such turning is prevented by both the latch rods 63 and by the engagement of the teeth of gear wheel 49 and rack 51. Said latch rod 63 is urged out of slot 55 by an expansive coil spring 64 engaging an abutment 65 on the rod and a shoulder 66 on the tube 58. A lug 67 is provided on the dash board 61 and extends through a slot 68 in the sleeve 63 to hold the same in its position of Figure 6 and which extends across the stop 65 so that the spring 64 cannot retract the latch rod. The rod 58 may be raised and lowered to position the gear 50 and when the rod 63 is permitted to raise out of the slot 55 operating rod 44 and its extension 46 may be turned through operation of the steering member 15 and thus impart steering movement to the rear wheels 12.

Various changes may be resorted to provided they fall within the spirit and scope of the invention.

I claim as my invention:—

1. In combination with a steering member having a gear thereon, and a gear meshing therewith for steering the front wheels of a motor vehicle, means to dirigibly steer rear wheels from said gear on the steering member through the movement of said member, means operable to move the said means into and out of operative position, means to permit such movement only when the rear wheels are in straight position, comprising a disk on the steering member having a slot and a lug on said means adapted for passage through the slot or to be intercepted by the disk, and means to hold said rear wheels in straight position when the dirigible means is in inoperative position.

2. In combination with a steering member having a gear thereon, means to dirigibly steer rear wheels having a shaft, one section of the shaft being movable relatively to another and having a gear thereon, means operable to move said movable shaft to mesh or demesh said gears, comprising a sleeve loose on the shaft, an operating rod pivoted to and extending from the sleeve, and a latch rod operable within the first mentioned rod, the said section having a slot adapted for engagement by said rod.

3. In combination with a steering member, means to dirigibly steer rear wheels having a shaft, one section of the shaft being movable relatively to another, means operable to move said movable shaft into and out of gear with said member, comprising a sleeve loose on the shaft, an operating rod pivoted to and extending from the sleeve, a latch rod operable within the first mentioned rod, the said section having a slot adapted for engagement by said rod, a gear on said section adapted to mesh with a gear on the steering member, a fixed rack adapted for engagement with the gear when the same is in inoperative position, a disk on the steering member provided with a slot, and a projection on said section adapted for passage through the slot when the rear wheels are in straight position.

In testimony whereof I affix my signature.

WILLIAM A. BOLZ, Sr.